June 8, 1943.   H. E. TREKELL   2,321,437
LAG PLATE
Filed June 13, 1942

Inventor:
Harold E. Trekell,
by  Harry E. Dunham
His Attorney.

Patented June 8, 1943

2,321,437

UNITED STATES PATENT OFFICE 2,321,437

LAG PLATE

Harold E. Trekell, Wakefield, Mass., assignor to General Electric Company, a corporation of New York Application June 13, 1942, Serial No. 446,867

5 Claims. (Cl. 171—264)

My invention relates to induction disk devices such as watthour meters and concerns particularly adjustable lag plates suitable for use in such devices.

It is an object of my invention to provide an improved, sturdy, easily manufactured lag plate which may be arranged for temperature compensation and which maintains its adjustment.

Other and further objects will become apparent as the description proceeds.

In my Patent No. 2,146,606, granted February 7, 1939, I disclosed a watthour meter with a lag plate which was adjustable to permit adjustment of both the lag and the light load torque of a watthour meter or similar device. The lag plate was movably mounted to provide independent adjustment of lag and light load torque.

A lag plate for watthour meters was disclosed also in Patent No. 2,050,881, Faus, granted August 11, 1936, which might be used alone or in conjunction with separate lag and light load plates for adjusting the lag and light load torque. In both of these types of lag plates a magnetic circuit was provided which was in inductive relation to the electric circuit of the lag plate and had a negative temperature coefficient of permeability to provide temperature compensation of the class of temperature errors of a watthour meter which are pronounced at low power factors.

In carrying out my present invention in its preferred form, I provide a lag plate which may be formed from sheet material and which also has the advantages of providing temperature compensation, but which is adjustable by variation of its resistance instead of by movement of its position as in the case of my patent and of the Faus patent just mentioned. The lag plate described in the present application may be used in conjunction with a separate movable lag plate if desired and is preferably used in conjunction with a separate light load plate or coil. In order to permit adjustment of the resistance of my lag plate, I form the plate with such a configuration that there is an extending U-shaped or hairpin-shaped portion, the resistance and electrical length of which may be varied.

Figure 1:
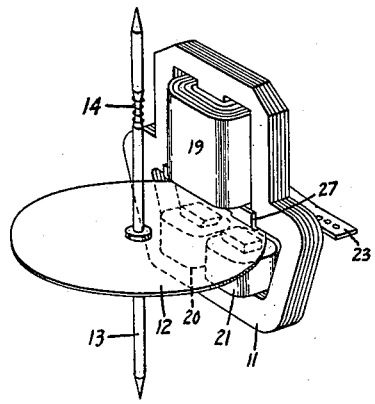
Figure 2:
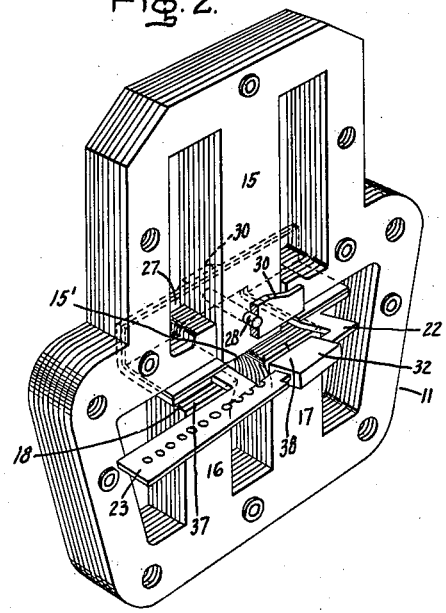
Figure 3:
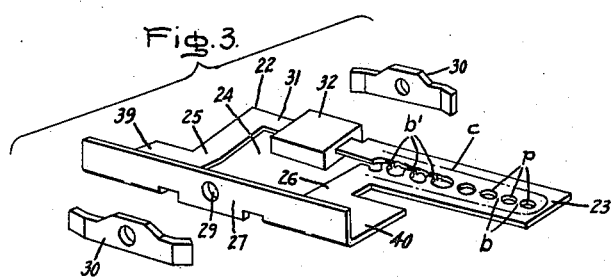
Figure 4:
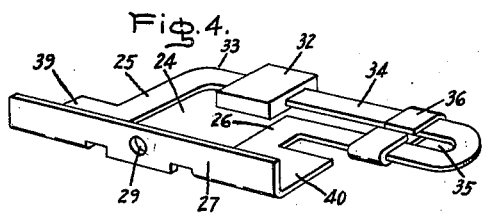

A better understanding of the invention will be afforded by the following detailed description considered in connection with the accompanying drawing and those features of the invention which are believed to be novel and patentable will be pointed out in the claims appended hereto. In the drawing, Fig. 1 is a perspective view of the operating mechanism of a watthour meter or similar device; Fig. 2 is a perspective view of the magnetic field structure of the apparatus of Fig. 1, together with a lag plate constituting one embodiment of my invention; Fig. 3 is an exploded perspective view of the lag plate shown in Fig. 2, together with the cleats for mounting it in position, and Fig. 4 is a perspective view of a lag plate forming another embodiment of my invention. Like reference characters are used throughout the drawing to designate like parts.

The lag plates disclosed herein will be described as used in connection with watthour meters since watthour meters are the principal commercial devices of the type which may be referred to as induction disk devices, in which there is a field structure producing two magnetic fields displaced in time and space phase and acting upon a rotor which ordinarily takes the form of an induction disk. The invention is applicable to other types of such devices, however, such as reactive voltampere hour meters, induction type watt meters, power relays, and the like.

As illustrated in Fig. 1 there is a magnetic field structure 11 having an air gap therein to receive a rotatably mounted induction disk 12. The induction disk 12 is composed of electrically conducting material such as aluminum or copper and is carried by a rotatably mounted spindle 13, the bearings of which are not shown. In the case of integrating devices such as watthour meters the spindle is provided with a suitable device such as a worm thread 14 to engage mechanism (not shown) to drive a watthour meter register (not shown).

As shown in Fig. 2 the field structure 11 includes an electromagnet core 15, and a pair of electromagnet cores 16 and 17. The inner ends of the magnet cores 15, 16 and 17 form pole faces and lie along spaced planes to form an air gap 18 to receive the disk 12 and a lag plate, which will be described more in detail hereinafter. Suitable yoke members are provided in the field structure 11 to form magnetic return paths from the outer ends of the magnet cores 15, 16 and 17 to the air gap 18. In the arrangement illustrated the magnet cores 15, 16 and 17 are united to the magnetic material forming the magnetic return paths to form an integral structure, preferably consisting of stacked laminations. However, the magnet core 15 need not necessarily be integral with the magnet cores 16 and 17.

For convenience the magnet core 15 will be referred to as a potential core and the cores 16 and 17 as current cores since in watthour meters it is common practice to wind a voltage or potential coil 19 (Fig. 1) on the single core 15 to form a voltage electromagnet and to wind a pair of coils 20 and 21 on the pair of magnet cores 16 and 17 to form a pair of current electromagnets.

For convenience in distinguishing the electromagnets in the description and claims the terms "potential" and "current" magnets and "potential" and "current" coils will be employed. It will be understood, however, that my invention is not limited to watthour meters or to apparatus in which a voltage responsive coil is mounted on the magnet core 15 and current responsive coils are mounted on the magnet cores 16 and 17.

It will be seen from the drawing that the magnets 16 and 17 are out of line with the magnet 15 and therefore the pole faces are displaced to provide displacement in space phase of the fluxes produced by the electromagnets represented by the cores 15, 16 and 17. Suitable means are provided to bring about the quadrature relationship in the time phase between the fluxes of the potential pole and the current poles. In the case of the watthour meter this comes about because the potential coil 19 consists of a large number of turns and is therefore highly inductive, so that the current drawn thereby is approximately in quadrature with the applied voltage. The current coils 20 and 21 are connected in series with the line so that the fluxes are in phase with line current. Owing to resistance losses and other causes, however, the exact quadrature (at unity power factor of the line current) is not obtained between the potential and current fluxes unless a lag coil or lag plate is employed. Such a lag coil must be adjusted to provide the requisite degree of lagging of the potential flux to bring it in exact quadrature with the current flux.

In order to adjust the amount of lagging produced by the lag plate, I may provide a lag plate 22 which has a projecting portion 23, the resistance of which may be adjusted (Fig. 3). The lag plate 22 is composed of suitable electrically conducting sheet material such as copper, for example, with the inside cut out to leave an opening 24, thereby forming a single flat closed electrical loop. The dimensions are so chosen that two of the sides of the loop 25 and 26 approximately span the pole face 15' of the potential magnet 15 in order to cause the potential flux from the pole face 15' to pass through the opening 24. Thus the lag plate 22 links substantially all of the potential flux which threads the disk. Adjustment of the resistance of the closed electrical circuit of the lag plate 22 provides adjustment of the current flowing therein, which is induced by the potential flux, and therefore provides adjustment of the amount of lagging of the potential flux.

The adjustable-resistance extending portion 23 is so designed that the principal electrical circuit is divided into two parts so as to have substantially a U shape or hair-pin shape. In the arrangement of Fig. 3 the extending portion 23 is provided with a plurality of perforations $p$ along the center line of the projection 23, thus leaving an uninterrupted U-shaped electrical current path $c$. The path $c$ is, however, short circuited or bridged by the connecting portions of metal $b$ between adjacent perforations $p$. For adjustment of the resistance of the circuit path $c$ of the extension 23 the requisite number of connecting portions $b$ are filed, cut, or otherwise severed to eliminate as many of the short-circuited paths as required to produce the requisite resistance. As illustrated in Fig. 3 the connecting portions which have been cut are designated with the primed letter $b'$ and the portions which have not been cut are represented by the unprimed letter $b$. If it is desired to reduce the resistance of the lag plate again after the connections $b'$ have been cut, one or more of them can be rejoined by soldering or brazing.

The lag plate 22 may be secured to the watthour meter in any desired manner. For the sake of sturdiness and rigidity of construction the lag plate is preferably secured directly to the magnetic field structure 11. For example, one side 27 of the lag plate 22 may be bent at right angles to the remainder of the plate in order to fit against one of the surfaces of the potential magnet 15. As illustrated in Fig. 2 the flange 27 fits against the back surface of the potential magnet core 15 and is secured thereto by a bolt 28 passing through an opening 29 in the flange 27 and a corresponding opening in the magnet core 15. Conveniently a pair of nonmagnetic cleats 30 may be provided, as shown, which fit against the front and back surfaces of the magnet core 15 serving the dual purpose of securing the lag plate 22 and binding together the laminations at the pole portion of the magnet 15.

As explained in the aforesaid Patents Nos. 2,146,606 and 2,050,881, in order to prevent the necessity for having a different lag plate adjustment for each different power factor at which the watthour meter operates, making temperature compensation possible at only one powerfactor, it is desirable to apply temperature compensation directly to the lag plate to correct any tendency of phase relationship between the potential current and the potential flux to vary with variations in resistance of the potential coil 19 because of variations in temperature. Such temperature compensation is readily provided in the type of lag plate described in my present application. One side 31 of the lag plate has a magnetic circuit member 32 mounted thereon. The magnetic circuit 32 is so shaped as to form a magnetic circuit surrounding the side 31 of the lag plate 22 whereby the magnetic circuit member 32 is in inductive relation to the electrical circuit of the lag plate 22. The magnetic circuit member 32 may be formed of one or more parts consisting of magnetic material, a portion or all of which has a negative coefficient of permeability. A construction and composition of the magnetic circuit member 32 such as described in either of the aforementioned Patents Nos. 2,050,881 and 2,146,606 may be employed.

The construction of Fig. 3 provides great sturdiness and ample security against variation in adjustment of resistance, after the proper adjustment has been ascertained. However, my invention is not limited to this specific construction. For example, as illustrated in Fig. 4, a modified form of lag plate 33 may be provided having an adjustable-resistance U-shaped extending portion 34 in which the material along the center line of the extending portion 34 is completely removed to leave a gap 35. For adjustment of resistance a sliding bridge 36 may be provided which is composed of relatively resilient electrically conducting material such as spring brass, for example, which may be slid back and forth along the extended portion 34 but which grips the surfaces of the portion 34 tightly enough to prevent undesired motion of the slider 36.

In some designs of watthour meters it is more convenient to lag both the current and potential fluxes. In this case, of course, a greater lagging of the potential flux is required in order to bring the potential and current fluxes into quadrature. If it is desired to provide lagging of the current flux, the portions of the sides 25 and 26 of the lag plate 22 or 33 are broadened where they cross the pole faces 37 and 38 of the current magnet cores 16 and 17. In this manner current lag plates 39 and 40 are formed. The dimensions of the portions of the potential lag plate 22 or 23 forming the current lag plates 39 and 40 are shown as substantially equaling the projections of the current pole faces 37 and 38. It will be understood, however, that the actual dimensions will depend upon the design of the watt-hour meter and the amount of current flux lagging desired. Adjustment to bring the two fluxes in quadrature will be made by the adjustment of the potential flux by varying the resistances of the extending portion 23 or 34 in the manner already described.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States is:

1. A lag plate for an induction disk device having a potential pole and a pair of current poles, said lag plate being secured in nonadjustable fixed relation to said device and comprising a sheet of electrically conducting material with an opening therein to form a single turn closed electrical loop with an extending hairpin shaped portion provided with means for varying the resistance thereof by short circuiting the same at different points along such portion, said loop having sides sufficiently spaced for the loop approximately to span the potential pole, said sides being relatively broad and each extending along one of the current pole faces for lagging current flux and a portion of said loop carrying in inductive relation to the loop a magnetic circuit member having a negative temperature coefficient of permeability to provide temperature compensation.

2. A lag plate for an induction disk device having a potential pole and a pair of current poles, said lag plate being secured in nonadjustable fixed relation to said device and comprising a sheet of electrically conducting material with an opening therein to form a single turn closed electrical loop with an extending hairpin shaped portion provided with a plurality of severable short circuiting bridges along the same for varying the resistance thereof, said loop having sides sufficiently spaced for the loop approximately to span the potential pole, said sides being relatively broad and each extending along one of the current pole faces for lagging current flux.

3. A lag plate for an induction disk device adapted to be secured in nonadjustable fixed relation to said device comprising a sheet of electrically conducting material with an opening therein to form a single turn closed electrical loop with an extending hairpin shaped portion provided with integral bridges across the same at different points which may be selectively severed for varying the resistance thereof, a portion of said loop carrying in inductive relation to the loop a magnetic circuit member having a negative temperature coefficient of permeability to provide temperature compensation.

4. A lag plate for an induction disk device said plate being secured in nonadjustable fixed relation to said device, said device having a potential pole and a current pole, said lag plate comprising a sheet of electrically conducting material with an opening therein to form a single turn closed electrical loop with an extending hairpin shaped portion provided with short circuiting means for varying the effective electrical length of such portion and hence the resistance thereof, said loop having sides sufficiently spaced for the loop approximately to span the potential pole, one of said sides being relatively broad and extending along a current pole face for lagging current flux.

5. A lag plate for an induction disk device comprising a sheet of electrically conducting material with an opening therein to form a single turn closed electrical loop with an extending portion of approximately hairpin shape and a slider adjustable in position along said extending portion for varying the electric circuit resistance therof.

HAROLD E. TREKELL.